United States Patent
Arntfield et al.

(10) Patent No.: US 12,514,563 B2
(45) Date of Patent: Jan. 6, 2026

(54) SYSTEM AND METHOD FOR DETECTING PNEUMOTHORAX

(71) Applicant: Deep Breathe Inc., London (CA)

(72) Inventors: Robert Thomas Arntfield, London (CA); Yuu Ono, Nepean (CA)

(73) Assignee: Deep Breathe Inc., London (CA)

( * ) Notice: Subject to any disclaimer, the term of this patent is extended or adjusted under 35 U.S.C. 154(b) by 20 days.

(21) Appl. No.: 18/446,197

(22) Filed: Aug. 8, 2023

(65) Prior Publication Data

US 2024/0148366 A1 May 9, 2024

Related U.S. Application Data

(60) Provisional application No. 63/382,370, filed on Nov. 4, 2022.

(51) Int. Cl.
*A61B 8/08* (2006.01)
*A61B 8/00* (2006.01)

(52) U.S. Cl.
CPC .............. *A61B 8/5223* (2013.01); *A61B 8/42* (2013.01); *A61B 8/4444* (2013.01); *A61B 8/463* (2013.01); *A61B 8/486* (2013.01); *A61B 8/5207* (2013.01)

(58) Field of Classification Search
CPC ....... A61B 8/5223; A61B 8/42; A61B 8/4444; A61B 8/463; A61B 8/486; A61B 8/5207; A61B 8/4416; A61B 8/4236; A61B 8/0833; A61B 8/565; A61B 8/085
See application file for complete search history.

(56) References Cited

U.S. PATENT DOCUMENTS

| | | | |
|---|---|---|---|
| 8,155,729 B1 | 4/2012 | Hsieh | |
| 2014/0276048 A1* | 9/2014 | Kiley | A61B 8/08 600/438 |
| 2017/0323130 A1* | 11/2017 | Dickinson | G06V 40/1306 |
| 2020/0054306 A1* | 2/2020 | Mehanian | A61B 8/5223 |
| 2020/0214679 A1* | 7/2020 | Silberman | A61B 8/465 |
| 2020/0395117 A1* | 12/2020 | Schnorr | G06N 3/088 |
| 2021/0093291 A1 | 4/2021 | Sanchez | |
| 2021/0204908 A1 | 7/2021 | Perrey | |
| 2021/0219839 A1* | 7/2021 | Kim | G06T 7/70 |
| 2021/0334644 A1* | 10/2021 | Yu | G06N 3/045 |

(Continued)

FOREIGN PATENT DOCUMENTS

| | | | |
|---|---|---|---|
| CA | 2993156 | 2/2017 | |
| CN | 111598868 A * | 8/2020 | A61B 8/08 |

(Continued)

OTHER PUBLICATIONS

Vanberlo et al., "Accurate assessment of the lung sliding artefact on lung ultrasonography using a deep learning approach", Computers in Biology and Medicine, vol. 148, Aug. 2022, 105953, https://doi.org/10.1016/j.compbiomed.2022.105953.

(Continued)

*Primary Examiner* — Kaitlyn E Sebastian
(74) *Attorney, Agent, or Firm* — Marks & Clerk; Jennifer Davy

(57) ABSTRACT

Systems and methods for autonomously detecting a condition based on lung ultrasound imaging. A wearable ultrasound sensor is used to obtain ultrasound data, and digital ultrasound images are processed using a machine learning model to predict the probability of lung sliding.

19 Claims, 9 Drawing Sheets

(56) References Cited

U.S. PATENT DOCUMENTS

2021/0345986 A1   11/2021  Cook
2022/0160334 A1    5/2022  Venkataramani
2023/0346337 A1   11/2023  Duffy

FOREIGN PATENT DOCUMENTS

| | | | |
|---|---|---|---|
| CN | 112801954 | 5/2021 | |
| CN | 112801957 | 5/2021 | |
| CN | 113855070 | 12/2021 | |
| CN | 114533128 | 5/2022 | |
| CN | 114767153 | 7/2022 | |
| WO | 2016085341 | 6/2016 | |
| WO | 2019236505 | 12/2019 | |
| WO | 2021054901 | 3/2021 | |
| WO | 2022049299 | 3/2022 | |
| WO | 2022140259 | 6/2022 | |
| WO | WO-2022125930 A1 * | 6/2022 | ........... G06T 7/0012 |

OTHER PUBLICATIONS

Jaur et al., "Detecting the Absence of Lung Sliding in Lung Ultrasounds Using Deep Learning", Appl. Sci. 2021, 11 (15), 6976, Jul. 29, 2021, https://doi.org/10.3390/app11156976.

International Search Report for PCT Application No. PCT/CA2023/051059, dated Oct. 20, 2023.

Written Opinion of the International Search Authority for PCT Application No. PCT/CA2023/051059, dated Oct. 20, 2023.

* cited by examiner

SYSTEM AND METHOD FOR DETECTING PNEUMOTHORAX

CROSS-REFERENCE

This application claims the benefit of U.S. Provisional Patent Application No. 63/382,370, filed Nov. 4, 2022, the entire content of which is incorporated herein by reference.

FIELD

The present disclosure relates to healthcare monitoring and detecting systems and methods. In particular, the disclosure relates to autonomous monitoring and detecting systems and methods.

BACKGROUND

Pneumothorax is a potentially life-threatening condition that commonly arises and is screened for in acute care environments such as in an emergency department, an intensive care unit, or an operating room.

Lung ultrasound, a point-of-care ultrasound technique, has shown excellent accuracy in assisting users to recognize and/or rule out pneumothorax. The presence or absence of a signature motion artifact, lung sliding, on the ultrasound image allows trained clinicians to assuredly rule out pneumothorax if lung sliding is present or deem it likely that lung sliding is absent. The skills required to image and interpret lung ultrasound are not routinely available, which results in continued reliance on chest x-rays which are less accurate, more time consuming, and expose patients to ionizing radiation.

SUMMARY

A wearable ultrasound sensor specifically designed to generate M-mode images, is used to generate M-mode lung ultrasound data. A deep learning model is used to automatically interpret the lung ultrasound with respect to the presence or absence of lung sliding from the lung ultrasound images. Alternatively, if the wearable ultrasound sensor generates 2-dimensional (B-mode) lung ultrasound images, these can be collected and converted to M-mode frames prior to analysis. The combination of a wearable ultrasound approach for the lung ultrasound with a deep learning-based interpretation strategy can offer a convenient, rapid, accurate, and resource-sparing approach to early detection and management of pneumothorax.

In a first broad aspect, there is provided a system for autonomously detecting a condition based on at least one ultrasound image of a lung, the system comprising: a wearable sensor for detecting an ultrasound pulse and automatically transmitting the ultrasound pulse to a digitizer for converting into a digital ultrasound image; and at least one processor operatively connected to the wearable sensor and configured to periodically: receive the digital ultrasound image; and provide the digital ultrasound image to a machine learning model to predict the probability of lung sliding.

In some cases, the condition is pneumothorax.

In some cases, the wearable sensor comprises: a first electrode having a first surface and a second surface wherein the first surface of the first electrode is for contacting a surface; a second electrode having a first surface and a second surface and wherein the second electrode overlaps the first electrode; a piezoelectric polymer film layer positioned between the second surface of the first electrode and the first surface of the second electrode; an acoustic insulation layer positioned overlapping the second surface of the second electrode; an electromagnetic shielding layer positioned overlapping the second electrode; a protection layer overlapping the electromagnetic shielding layer; and wherein an active sensing area is an area defined by the overlapping of the first electrode and the second electrode.

In some cases, an ultrasonic device for transmitting and receiving ultrasound pulses is coupled to the first electrode and the second electrode.

In some cases, the ultrasonic device produces electric pulses with a voltage of between −500 V and 500 V and with a duration of up to 100 ns.

In some cases, the piezoelectric polymer film has a thickness of between about 20 μm and 200 μm.

In some cases, the first electrode and the second electrode comprise a layer of silver ink or conductive material.

In some cases, the acoustic insulation layer is an air gap.

In some cases, the active sensing area is between 5 mm by 5 mm and 30 mm by 30 mm.

In some cases, the wearable sensor is removably attached to the surface by an ultrasonic gel couplant or adhesive materials.

In some cases, the ultrasonic device periodically and automatically transmits and receives ultrasound pulses for the duration the wearable sensor is in contact with the surface.

In some cases, the ultrasonic device transmits and receives ultrasound pulses at intervals of 40 μs or greater for the duration the wearable sensor is in contact with the surface.

In some cases, the at least one processor operatively connected to the wearable sensor is further configured to receive the digital ultrasound image at intervals of between 1 minute and 1 hour.

In some cases, the digital ultrasound image in an M-mode image.

In some cases, the machine learning model is a convolutional neural network.

In some cases, the machine learning model is instantiated from a transfer learning approach using a pre-defined network architecture including at least one of EfficientNetB0, ResNet, and MobileNet.

In some cases, the at least one processor operatively connected to the sensor is further configured to train the machine learning model based on being pre-trained on an ImageNet database.

In some cases, the at least one processor operatively connected to the sensor is further configured to train the machine learning model based on being pre-trained on ultrasound images using self-supervised learning techniques.

In some cases, the machine learning model includes a custom top block containing a global average pooling layer, followed by a series of fully connected layers with dropout interleaved.

In some cases, a priority metric of the machine learning model is a sensitivity toward absent lung sliding.

In some cases, the at least one processor operatively connected to the sensor is further configured to optimize a set of hyperparameters for the machine learning model based on hyperparameter optimization.

In some cases, the predicted probability is an output of a sigmoid final layer of the machine learning model.

In some cases, the hyperparameter optimization comprises using an optimizer with a learning rate in the range of between 0.00001 and 0.01.

In some cases, the learning rate is multiplied by a constant in the open interval (0,1) after a fixed number of training steps, facilitating the decay of the learning rate throughout training.

In some cases, a focusing parameter is in the range of between 0 and 5, and a class weight factor is in the range of 0.01 and 2.

In some cases, the hyperparameter search is run for a plurality of iterations.

In some cases, the at least one processor operatively connected to the wearable sensor is further configured to output the predicted probability to a display.

In some cases, the at least one processor operatively connected to the wearable sensor is further configured to send an alert to the display when the predicted probability of absent lung sliding is greater than 90%.

In some cases, the alert is at least one of a visual alert and an audible alert.

In another broad aspect, there is described the use of the system as described herein.

In another broad aspect, there is provided a method of autonomously detecting a condition based on at least one ultrasound image of a lung, the method comprising: receiving the ultrasound image from a wearable sensor in contact with a surface; providing the ultrasound image to a machine learning model to predict a probability of lung sliding; wherein the receiving further comprises periodically receiving ultrasound information for the duration the wearable sensor is in contact with the surface.

In some cases, the condition is pneumothorax.

In some cases, the ultrasound image in an M-mode image.

In some cases, the machine learning model is a convolutional neural network.

In some cases, the machine learning model is instantiated from a transfer learning approach using a pre-defined network architecture including at least one of EfficientNetB0, ResNet, and MobileNet.

In some cases, the at least one processor operatively connected to the sensor is further configured to train the machine learning model based on being pre-trained on an ImageNet database.

In some cases, the at least one processor operatively connected to the sensor is further configured to train the machine learning model based on being pre-trained on ultrasound images using self-supervised learning techniques.

In some cases, the machine learning model includes a custom top block containing a global average pooling layer, followed by a series of fully connected layers with dropout interleaved.

In some cases, a priority metric of the machine learning model is a sensitivity toward absent lung sliding.

In some cases, the at least one processor operatively connected to the sensor is further configured to optimize a set of hyperparameters for the machine learning model based on hyperparameter optimization.

In some cases, the predicted probability is an output of a sigmoid final layer of the machine learning model.

In some cases, the hyperparameter optimization comprises using an optimizer with a learning rate in the range of between 0.00001 and 0.01.

In some cases, the learning rate is multiplied by a constant in the open interval (0,1) after a fixed number of training steps, facilitating the decay of the learning rate throughout training.

In some cases, a focusing parameter is in the range of between 0 and 5, and a class weight factor is in the range of 0.01 and 2.

In some cases, the hyperparameter search is run for a plurality of iterations.

In some cases, the method further comprises outputting the predicted probability to a display.

In some cases, the method further comprises sending an alert to the display when the predicted probability of absent lung sliding is greater than 90%.

In some cases, the alert is at least one of a visual alert and an audible alert. Other aspects and features of the disclosure will become apparent to those ordinarily skilled in the art upon review of the following description of specific embodiments of the disclosure.

BRIEF DESCRIPTION OF THE DRAWINGS

Embodiments of the disclosure will now be described in greater detail with reference to the accompanying drawings, in which.

DETAILED DESCRIPTION OF EMBODIMENTS

Deep learning models provide a means to automatically confirm the absence of lung sliding from lung ultrasound images, such as M-mode images or 2-dimensional lung ultrasound images that are converted to M-mode frames prior to analysis and thereby generating a time-lapsed image of the lung sliding, or its absence. M-mode images are smaller in size and less computationally complex to analyze than videos of lung sliding and carry a difference in appearance between lung sliding and the absence of lung sliding.

Wearable ultrasound is an application of ultrasound where small ultrasound sensors can be affixed to the body of a patient to produce either 2-dimensional or M-mode images in a continuous manner. To date, frequent or continuous ultrasound surveillance has been limited in the clinical setting. This is possibly because the generation of images in a continuous manner generally calls for continuous image interpretation.

As pneumothorax is a common, potentially life threatening, and often unpredictable cause of patient health deterioration, it is a candidate condition for which continuous surveillance with ultrasound is feasible and desirable. The established accuracy of deep learning models for interpretation of patterns, associated with the presence or absence of pneumothorax, makes possible the automation of image interpretation. The described combination of a wearable ultrasound device with a deep learning model for autonomous, real-time image interpretation offers a convenient, rapid, accurate, and resource-sparing approach to early detection and management of pneumothorax.

Figure 1:
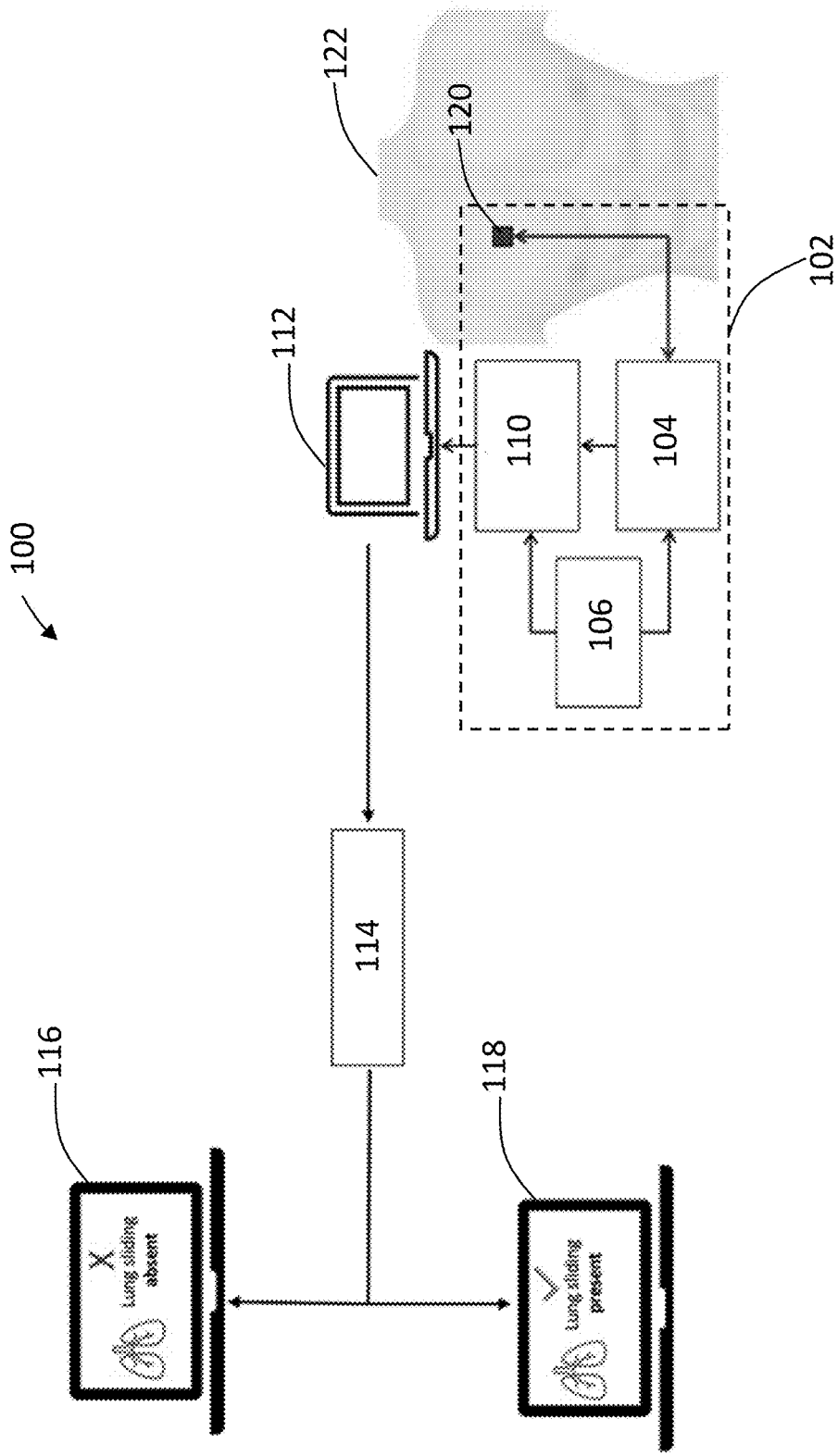
FIG. 1 is a system block diagram of a system for predicting the absence of lung sliding according to at least one embodiment.

FIG. 1 illustrates a monitoring and detection system 100 for detecting and monitoring pneumothorax in a patient 122 according to at least one embodiment. The system 100 comprises a wearable ultrasound device 102, an ultrasound sensor 120, an ultrasonic pulser and receiver 104, a function generator 106, an analog to digital converter 110, a computer 112, a machine learning model 114 which provides an output 116, 118 to indicate whether or not pneumothorax is detected in the patient 122.

The wearable ultrasound device 102 is attached to the patient's 122 skin, covering the pleural line, and comprises the ultrasound sensor 120, the ultrasonic pulser and receiver 104, the function generator 106, and the analog to digital converter 110. The ultrasonic pulser and receiver 104 applies an electric pulse, triggered by the function generator 106 to the ultrasound sensor 120. The ultrasound sensor 120 converts it into an ultrasound pulse which is transmitted into the patient 122 body. The ultrasound sensor 120 receives the reflected ultrasound pulse and converts it into an electric signal. The electric signal is transmitted to the analog to digital converter 110, which converts the electric signal into a digital signal. The digital signal is sent to the computer 112 and is analyzed by a machine learning model 114 to predict the probability of the patient 122 having pneumothorax based on the digital image. The presence of pneumothorax is determined by a sufficient probability of an absence of lung sliding in the digital image, whereas a sufficient probability that lung sliding is present indicates the absence of pneumothorax.

Figure 2A:
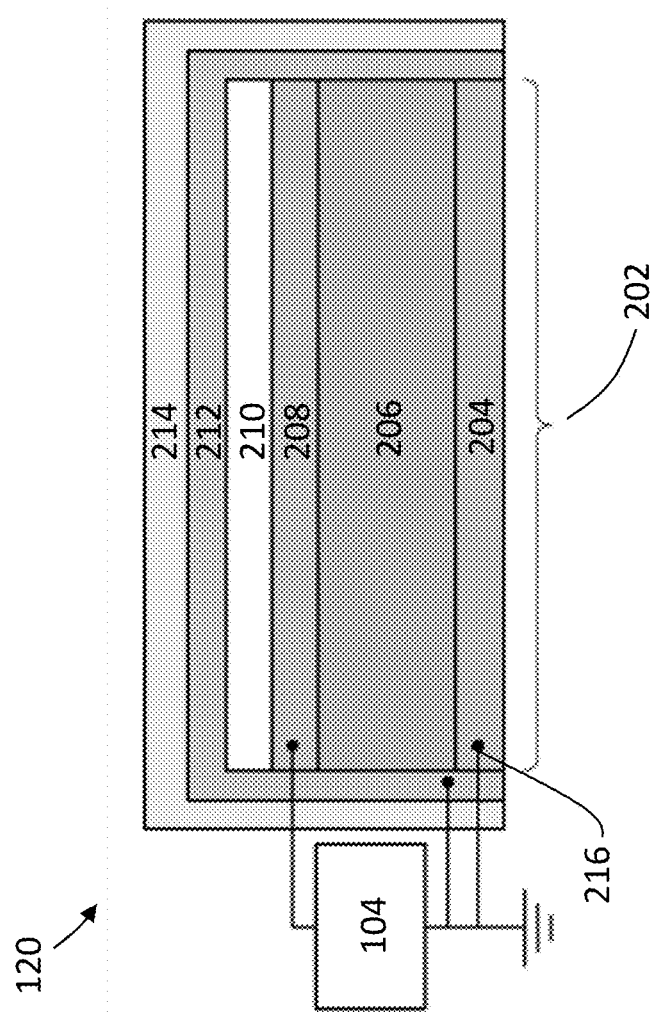
FIG. 2A is a cross-sectional diagram of the ultrasound sensor of the system of FIG. 1.
Figure 2B:
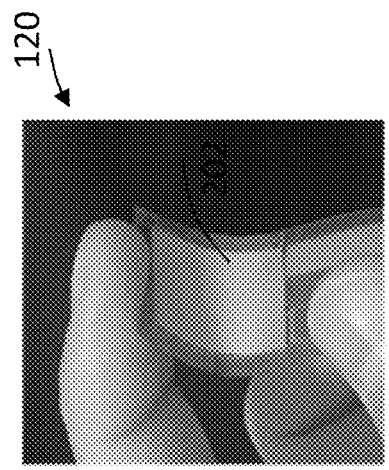
FIG. 2B is a photograph of the ultrasound sensor of the system of FIG. 1.

With reference to FIG. 2A, the structure of one example ultrasound sensor 120 is shown. The ultrasound sensor 120 is connected to the ultrasound pulser and receiver 104, and the ultrasound pulser and receiver 104 is connected to the analog to digital converter 110. The ultrasound sensor 120 generally comprises a plurality of layers. In the illustrated example, the layer of piezoelectric polymer film 206 has a layer of conductive medium (e.g., silver ink) coupled to its top and bottom surfaces. The layers of conductive medium form top and bottom electrodes 204, 208, respectively. The piezoelectric polymer film layer 206 is constructed from a 110 μm thick Polyvinylidene fluoride (PVDF) film, such as that available from Measurement Specialities Inc., Hampton, VA, USA, with part number 3-1004346-0. However, the piezoelectric polymer film layer 206 generally may be between 20 μm and 200 μm thick. The piezoelectric film layer may also comprise a plurality of layers to control the operating ultrasonic frequency. In the illustrated example, the conductive ink layers that form the top and bottom electrodes 204, 208 are about 6 μm thick. An active ultrasonic sensing area 202 is defined by the overlapping area of the top and bottom electrodes 204, 208. The active ultrasonic sensing area 202 is selected to be large enough to cover the tissues of interest, including a chest wall, pleura and lung. The active ultrasound sensing area 202 is illustrated in FIG. 2B. The active ultrasound sensing area 202 is approximately 20 mm by 20 mm, but may be in the range of about 5 mm by 5 mm up to about 30 mm by 30 mm. The active ultrasound sensing area 202 is generally rectangular but may be of any other shape such as round or oval.

An acoustic insulation layer 210 may be provided above the top electrode 208. The acoustic insulation layer can be an air gap layer, which is created by placing a thin layer of paper, without bonding, on the surface the top electrode 208. A thin air gap exists between the paper layer and the top electrode 208. With the exception of the active ultrasound sensing area 202, an electromagnetic shielding layer 212 covers the layers of the bottom electrode 208, the piezoelectric polymer film 206, the top electrode 208, and the acoustic insulator layer 210. The electromagnetic shielding layer 212 is a 20 μm thick polyimide film for electrical isolation and protection. A final protective layer 214 encompasses the electromagnetic shielding layer 212, with the exception of the active ultrasound sensing area 202. The wearable ultrasound device 102 is flexible and lightweight. The wearable ultrasound device 102 may be attached to the patient 122 with an ultrasonic gel couplant. The flexible nature of the wearable ultrasound device 102 allows for conformation to the skin surface which reduces deformation of the tissues underneath. The wearable nature of the wearable ultrasound device 102 reduces motion artefacts, which are typically caused by undesired movement of the patient's 122 body and/or a handheld ultrasound probe held on the body. The wearable ultrasound device 102 can be worn for continuous and long-term ultrasound monitoring.

Figure 3B:
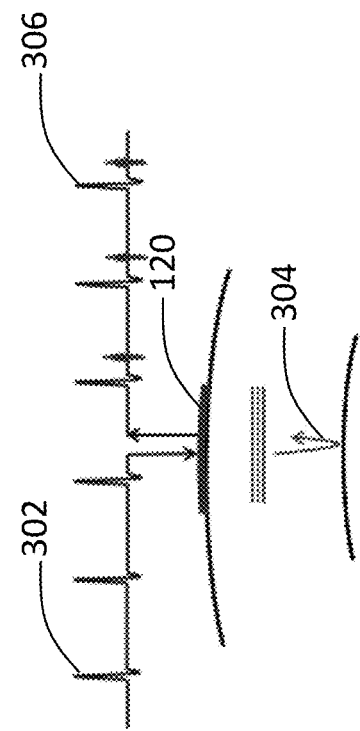
FIG. 3B is a diagram of transmitted and received pulses.
Figure 3A:
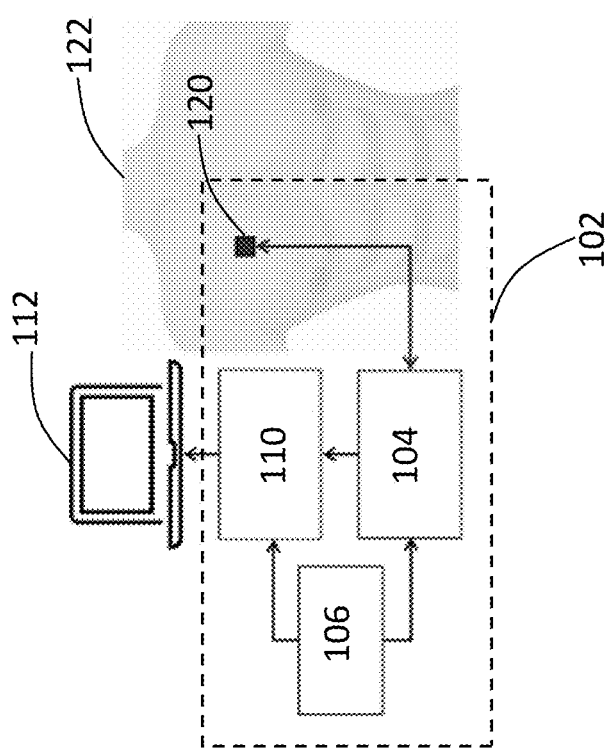
FIG. 3A is a portion of the system block diagram showing the wearable ultrasound device of FIG. 1.
Figure 4:
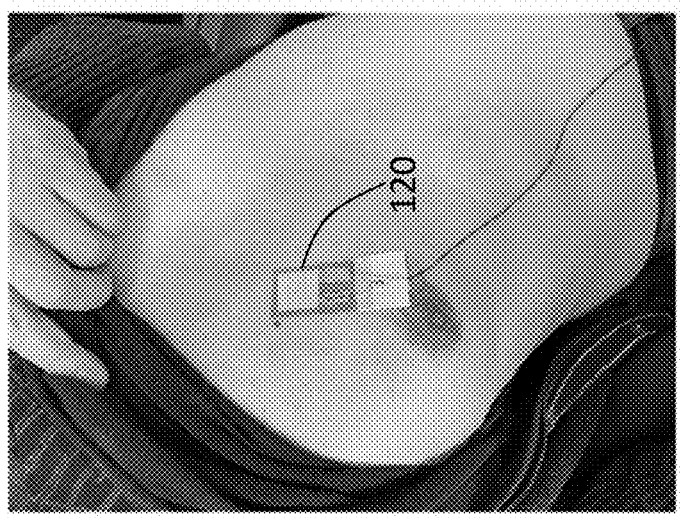
FIG. 4 is a photograph of an example wearable ultrasound sensor affixed to a patient.

With reference to FIG. 3A, FIG. 3B, and FIG. 4, the wearable ultrasound device 102 is shown, with the ultrasound sensor 120 secured over the lung. The ultrasound sensor 120 generally is positioned to maximize the amplitude of the ultrasound pulses reflected from the pleural line. To prevent lateral and vertical movement of the ultrasound sensor 120 that may cause motion artifacts of the acquired ultrasonic signals during the acquisition of the reflected ultrasound pulses, the ultrasound sensor 120 and/or the wearable ultrasound device 102 may be secured to the patient's 122 skin. For example, the ultrasound sensor 120 may be attached by application of an adhesive tape on top of the ultrasound sensor 120 that overlaps onto the patient's 122 skin. An ultrasonic gel couplant may be applied between the active ultrasound sensing area 202 and the patient's 122 skin surface to enable effective transmission of the ultrasound pulses.

It is noted that, in FIG. 4, only the ultrasound sensor 120 is shown attached on the patient chest, with the remainder of the wearable ultrasound device 102 worn elsewhere on the patient body. However, in some embodiments, the ultrasound sensor 120 may be integrated into the wearable ultrasound sensor 102, such that the entire integrated device may be attached on the patient chest.

In some alternative embodiments, the ultrasound sensor 120 may integrated with, or into, another sensor, such as an electrocardiogram (ECG) sensor.

Figure 5A:
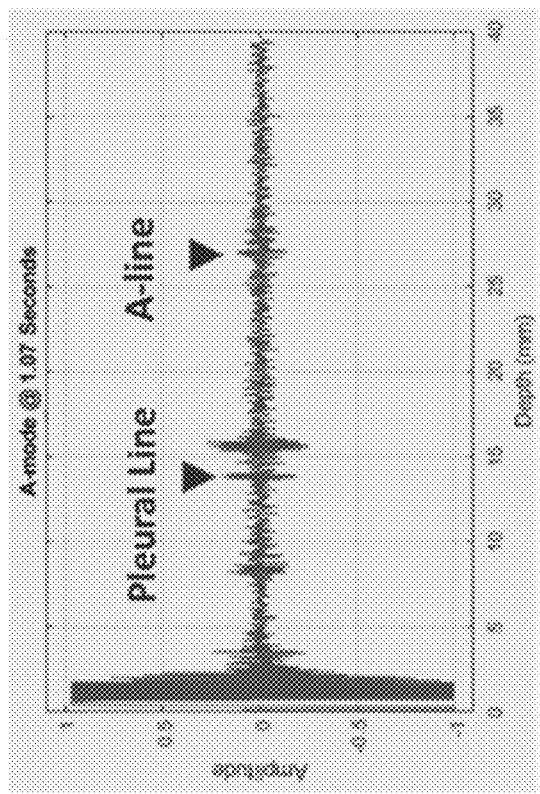
FIG. 5A is a view of an A-mode ultrasound signal.
Figure 5B:
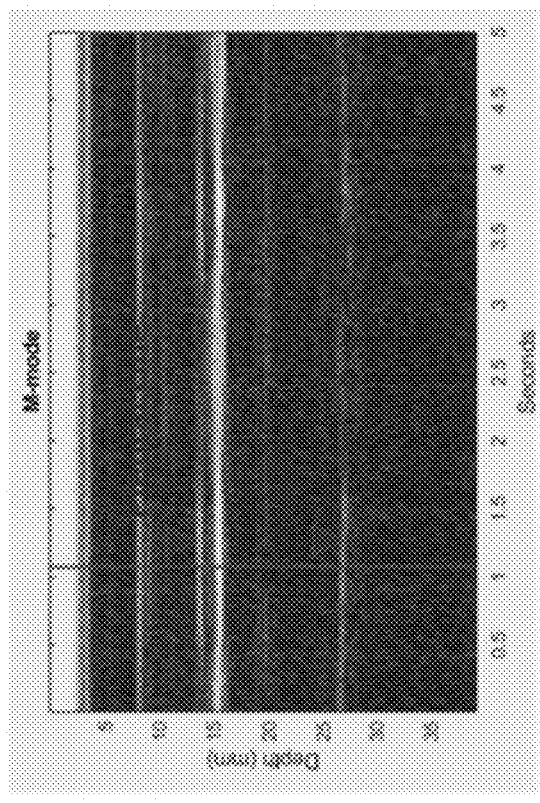
FIG. 5B is a view of an M-mode ultrasound image.

The wearable ultrasound device 102 operates as a generator and a receiver of ultrasound pulses. The ultrasonic pulser and receiver 104 may be of the type available from JSR Ultrasonics, Pittsford, NY, USA with model number DPR300. The ultrasonic pulser and receiver 104 is operatively connected to the ultrasound sensor 120 by terminals 216 that connect to the bottom and top electrodes 204, 208, and to the electromagnetic shielding layer 212. Electrode 204 and layer 206 are electrically connected and grounded. However, electrode 208 is electrically isolated from 204 and 206. The ultrasonic pulser and receiver 104 produces short electric pulses 302 with a peak voltage of up to 475 V, with a pulse duration of between approximately 10 ns to 70 ns. As patient 122 safety is a concern, the effective voltage ($V_e$) applied to the wearable ultrasound device 102 is given by equation (1):

$$V_e = \sqrt{\frac{1}{T}\int_0^{T_w} V_p^2 dt} \quad (1)$$

where T is the pulse interval time, $T_w$ is the pulse time duration, and $V_p$ is the peak voltage. For instance, $V_e$ is calculated to be 3.97 V when T is 1 ms, $T_w$ is 70 ns, and $V_p$ is 475 V. The pulse time duration may up to 200 ns. The electric pulses 302 are converted to pulsed ultrasound 304. Some ultrasonic devices may use a negative pulse, therefore the range of voltage for operation may be ±500 V. The pulsed ultrasound 304 is transmitted into the patient 122 and reflected from the internal boundaries of the tissue back to the ultrasound sensor 120. The ultrasound sensor 120 detects the reflected ultrasound pulses 304. The ultrasound sensor transmits and receives ultrasound pulses at intervals of 40 or 80 μs or greater while it is monitoring for absent lung sliding. The pulse interval depends on the minimum depth used to detecting the condition. For example, a pulse interval of at least 80 is corresponds to a depth of 6 cm, which is beneficial to detecting pneumothorax in adults. However, a pulse interval of 40 μs would be sufficient for a depth of 3 cm, which may be sufficient for detecting pneumothorax in children. The ultrasonic pulser and receiver 104 transmits an electric pulse to and receives an electric signal from the ultrasound sensor 120. The ultrasonic pulser and receiver 104 includes a built-in amplifier, low pass filter and high pass filter (not shown). The built-in amplifier amplifies the electrical signal 306 of the reflected ultrasound pulses 304 to within the input range of the analog to digital converter 110 (e.g., ±0.5 V). This generates an A-mode ultrasound profile, an example of which is shown in FIG. 5a. Motion-mode (M-mode) images are created through successive A-mode ultrasound signals obtained using the ultrasound sensor 120, an example of which is shown in FIG. 5B.

The function generator 106 provides a trigger signal to the ultrasonic pulser and receiver 104 and the analog to digital converter 110. The function generator 106 controls the electric pulse repetition frequency and synchronizes the two devices. The pulse repetition frequency may be set to any suitable frequency, e.g., 12.5 kHz or 25 kHz. The received ultrasound pulses 304 are sampled at a suitable sampling frequency of between 30 to 125 MHz by the analog to digital converter 110. The analog to digital converter 110 is an analog to digital converter with a resolution of, e.g., 8 to 16 bits, such as the ATS 9440 model available from Alazartech, Montreal, QC, Canada. Use of the greater bit resolution aids in achieving higher depth resolution. The digitized signals are then stored in the computer 112 for analysis.

The generated M-mode images from the wearable ultrasound device 102 are subjected to an automated, computer vision analysis process using a lung sliding model. The use of M-mode images for the deep learning process, over other motion-based evaluations, may improve computational speed is valued in a clinical setting, which may be desirable as assessment for pneumothorax is commonly a medical emergency. Deep computer learning models that operate on single-image inputs are, in general, significantly less complex than those that operate on videos, and consequently require less inference time as a still image as compared to a typical ultrasound video which is typically 30 frames per second (FPS). In at least some of the described embodiments, M mode images represent 3 second segments collapsed into a single frame. Accordingly, a single frame can be used for inference rather than 90 frames. In the examples shown, the M-mode images from the analog to digital converter 110 contain 180×224 pixels, containing orders of magnitude fewer pixels than the original B-mode clips.

Figure 6B:
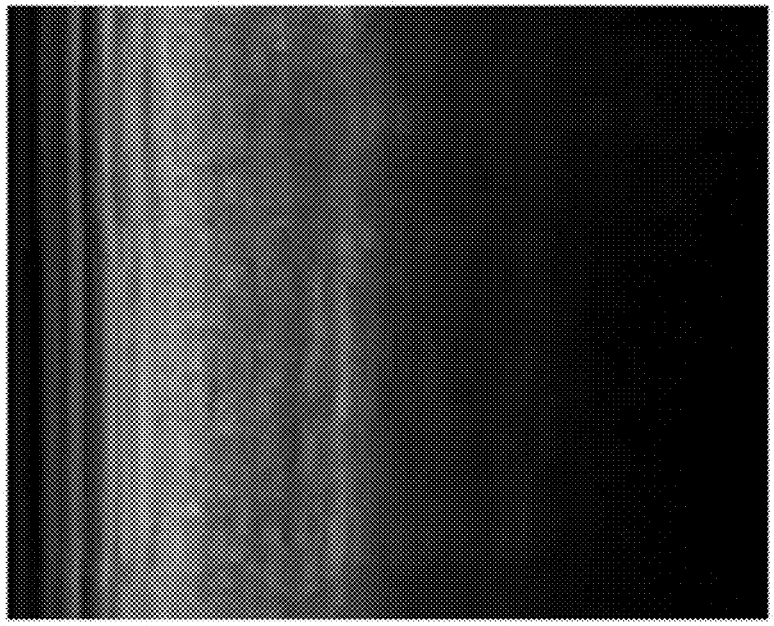
FIG. 6B is a view of an M-mode ultrasound image with lung sliding present.
Figure 6A:
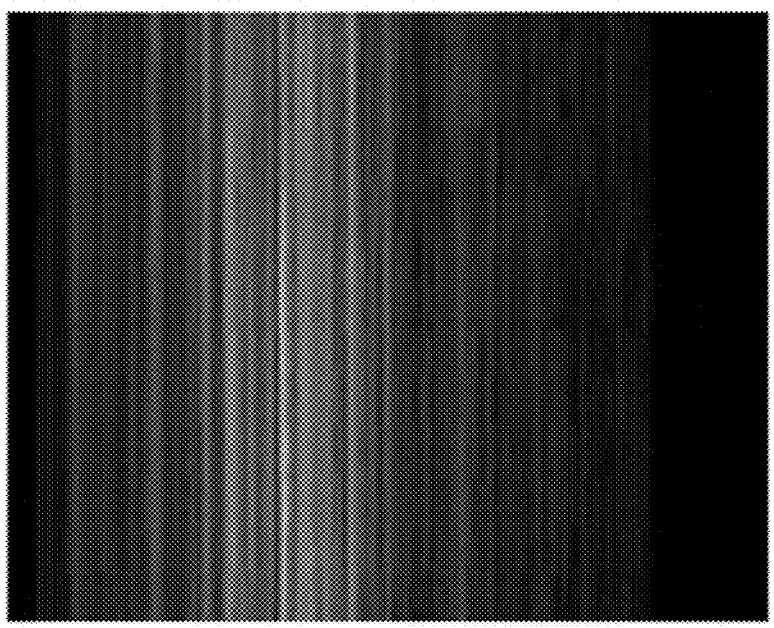
FIG. 6A is a view of an M-mode ultrasound image with absent lung sliding.

The use of M-mode images is also preferable due to the presence of artifacts that are used in practice to distinguish absent versus present lung sliding. The "barcode sign" or the "stratosphere sign" indicates that lung sliding is absent, whereas the "seashore sign" indicates the normal state where lung sliding is present. An example of the "barcode sign" indicating the absence of lung sliding, is shown in FIG. 6A, and an example of the "seashore sign" indicating the presence of lung sliding is shown in FIG. 6B. The M-mode images that indicate the absence of lung sliding are in a positive class, and those with lung sliding present are in a negative class.

Although some of the embodiments of the monitoring and detection system 100 analyze M-mode images directly, it is also possible to pre-process 2-dimensional (B-mode) ultrasound frames into M-mode images. Multiple 2-dimensional ultrasound frames are used in order to construct a time lapse, M-mode image. In the event that the wearable ultrasound device 102 generates 2-dimensional images, such pre-processing capability can be used to obtain M-mode images.

Figure 7:
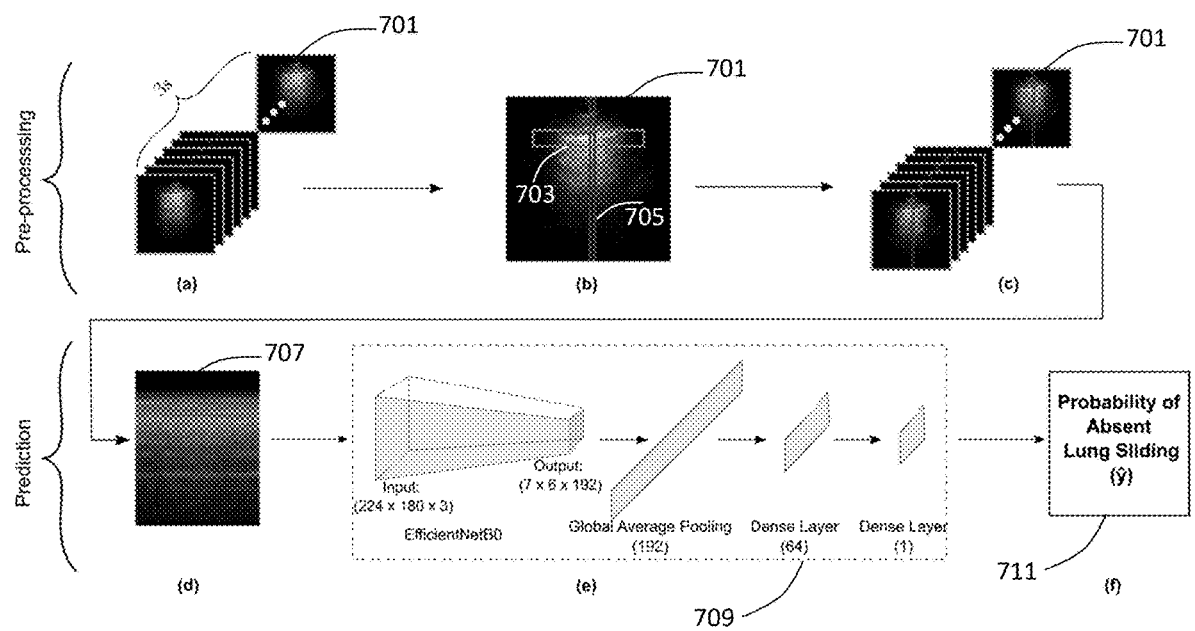
FIG. 7 is a diagrammatic view of an example deep learning model for use with the system of FIG. 1.

An example of the pre-processing of 2-dimensional images to create an M-mode image is illustrated in FIG. 7. In summary, at (a) a 3 second lung ultrasound clip is divided into a plurality of 2-dimensional frames 701. At (b) a vertical slice 705 of a 2-dimensional frame 701 is selected and restricted to within a selection of the pleural line region of interest 703. At (c) the vertical slice 705 process is applied to the plurality of the 2-dimensional frames 701. At (d) the processed 2-dimensional frames 701 are concatenated to create the M-mode image 707. M-mode images are applied to the deep learning model 709 for computer vision analysis at step (e), with the output 711 of predicted probability of the absence of lung sliding at step (f). Steps (e) and (f) are applicable in the case where M-mode images are generated and analyzed directly.

To determine the slice 705 of choice for M-mode reconstruction, each clip's first frame 701 is identified and subjected to a median filter with a 3×3 kernel. The column-wise pixel intensity sums are then computed. The columns with the highest intensity sums are used as candidates for the selection of the horizontal position of choice for vertical slicing. This method takes advantage of the relative brightness of the pleural line within a B-mode video to effectively locate a vertical slice 705 with comprehensive inclusivity of the pleural line. The column of choice can be determined by randomly selecting one of the 15 columns with the highest intensity sums within the image. To avoid cases where the chosen column does not intersect the pleural line, the vertical slice 705 selection is restricted to the horizontal bounds of the pleural line's region of interest 703, step (b) of FIG. 7. Once this column has been chosen, a frame-wise horizontal median is applied for a 3×224 image section, which consists of the selected column as well as the columns to the immediate left and right. The resultant output is a single 224-dimensional vector for each frame 701 of a clip, which is then horizontally concatenated with all such vertical slices 705 from each frame 701 in the same clip, step (c) in FIG. 7, to form a single M-mode image, step (d) in FIG. 7. The initial width of each M-mode image is based on the clip's frame rate, where each M-mode has a width of three times the frame rate, since each clip is 3 second in duration. To standardize the data, each M-mode image is then resized using bicubic interpolation to 180×224 pixels.

The wearable ultrasound device 102 can continuously transmit and receive ultrasound pulses 304 for the duration that the wearable ultrasound device 102 is affixed to the patient 122. The wearable ultrasound device 102 can be configured to monitor at set time intervals, e.g., between 1 minute and 1 hour, each generating an M-mode image with a configurable duration, such as 3 seconds. In practice, the interval can be as low as the duration of the M-mode image and the processing time, if desired. The deep learning model 709 assesses the received M-mode images for the presence of absence of lung sliding. The outputted prediction 116, 118 is sent to a computer 112, or similar device. The outputted prediction 118 can provide a clinician with an indication that lung sliding is present. This can be displayed visually, for example on a screen of the computer 112, or transmitted to a different device (e.g., via Wi-Fi or Bluetooth™). The outputted prediction 116 can provide the clinician with an indication that lung sliding is absent. In the event that lung sliding is absent, and pneumothorax is detected or is predicted to be likely, an indication that lung sliding is absent can be displayed visually on the computer 112. This may also be accompanied by an alarm that may be visual, audible, a combination of both, and similar. The probability of absent lung sliding at which the deep learning model 709 sends an indication of absent lung sliding can be based on a sufficient probability, such as when, e.g., the probability exceeds 90%.

The machine learning or deep learning model may be any suitable transfer learning approach, such as a convolutional neural network. The deep learning model 709 may be based on any pre-defined network architecture including, but not limited to, EfficientNetB0, ResNet, and MobileNet. In at least some of the described embodiments, the deep learning model 709 is based on the EfficientNetB0 model, which offers high performance for comparatively fewer parameters in comparison with other deep learning models. These characteristics reduce the inference time for predicting the presence of pneumothorax, which is in a factor for applications in the clinical setting.

The deep learning model 709 may be pre-trained based on the ImageNet database, or may be pre-trained based on other pre-training images, including those of ultrasound images through self-supervised learning techniques. The model's pre-trained ImageNet weights are loaded, and the first 30 layers can be frozen. The final block of the EfficientNetB0 model is removed to further reduce complexity and avoid overfitting. A custom top block is added, which contains a global average pooling layer followed by a series of fully connected layers without dropout interleaved. With reference to FIG. 7, these layers are part of the deep learning model 709 at step (e).

The deep learning model 709 is trained using M-mode images that were batched into sets of 40 and provided to the model 709. This is the training set, used to train the deep learning model 709 for the prediction of pneumothorax. To provide diversity to the training set, the M-mode images may be augmented. The applied augmentations can include: random brightness changes up to a delta factor of 10%, random contrast adjustment between 70% to 100% of the original contrast, random horizontal left to right flip of the image, and random addition of gaussian noise with a mean of 0 and a standard deviation of 5. Each augmentation had an 80% chance of being applied to an M-mode image. Pixel values for all inputs are scaled from the [0, 255] range to the [−1, 1] range used by the pre-trained ImageNet weights for the EfficientNetB0 model.

As the deep learning model 709 is for detecting pneumothorax and lung sliding, the data provided to the model are clips that feature an A line pattern and are of the anterior or antero-lateral regions of the chest. These regions are the most commonly used regions for pneumothorax detection. Within this subset, the clips that feature the label "absent lung sliding" are identified, forming the positive class and guiding the size of the set of clips comprising the more abundant negative class (lung sliding present). Optionally, clips labelled as containing B lines, consolidations, pleural effusions, excessive probe movement, or those containing annotations in the ultrasound field can be excluded. In the examples described herein, the clips were obtained from two hospitals, and from approximately 600 patients.

Any clips demonstrating lung pulse (a related and more subtle artefact than lung sliding that also excludes pneumothorax) but no lung sliding are included in the negative class, given their subtle amount of pleural line movement. Optionally, clips demonstrating lung-point (the intersection of lung sliding and no lung sliding seen with pneumothorax) may be excluded from the dataset.

Each clip is formatted to 3 seconds in length with a frame size of 224×224 pixels to standardize the size of the model's data inputs. Clips that are 6 seconds or longer can be split into more than one 3 second clip. The clip duration of 3 seconds is selected to be sufficiently long to discern the presence or absence of lung sliding, although other lengths of clip can be used. In the examples described herein, the total dataset consisted of 3075 individual 3 second clips; 2299 with lung sliding, and 776 clips with absent lung sliding.

The dataset for model training can be subjected to a random, patient-wise split into training and holdout sets. The training set can be further split by patient for a stratified 10-fold cross validation test. Hence, all clips obtained from each unique patient are confined to a single set (i.e., training, validation, holdout) without overlap. An example data set is shown in Table 1 showing the mean and the standard deviation (STD).

TABLE 1

| | Training Data | | | | Holdout Data | | | |
| --- | --- | --- | --- | --- | --- | --- | --- | --- |
| | Absent lung sliding (positive class) | | Lung sliding (negative class) | | Absent lung sliding (positive class) | | Lung sliding (negative class) | |
| | Patients | Clips | Patients | Clips | Patients | Clips | Patients | Clips |
| Mean (STD) | 179.1 (1.4) | 620 (19) | 446.4 (2.1) | 1965.6 (33.2) | 19.9 (1.4) | 69.9 (12.2) | 49.6 (2.1) | 218.4 (33.2) |

Any information extraneous to the ultrasound beam can be removed from all clips (e.g., index mark, vendor logo, battery indicator, depth markers) using a dedicated DL tool such as AutoMask from WaveBase Inc., Waterloo, Canada.

The first frame of each lung ultrasound clip is passed into an object detection model previously trained to determine the region of interest 703 around the pleural line in a single lung ultrasound image. The region of interest 703 can be assumed to be constant for the duration of the clip. Therefore, one pleural line region of interest is computed for each lung ultrasound clip in the dataset.

The Single-Shot Detector (SSD) implementation provided by TensorFlow's object detection library is used to train a pleural line detector. In the described examples, the model was trained on a set of 49,357 lung ultrasound frames from 196 parenchymal lung ultrasound clips and evaluated on a holdout set of 14,100 lung ultrasound frames from 53 clips. The dataset was randomly sampled from the lung ultrasound database and labelled by clinicians fluent in lung ultrasound. Each label consisted of a bounding box enclosing the pleural line (x- coordinate, y-coordinate, width, and height in pixels). Four anchor aspect ratios were determined by applying k-means clustering to the aspect ratios of the bounding boxes of frames in the training set. The model was trained for 25,000 steps with a batch size of 8. The region of interest with the greatest confidence returned by the SSD model was taken to be the pleural line region of interest 703. To determine the pleural line region of interest 703 in the present work, the SSD model was employed to predict the region of interest 703 for the first frame of a clip. The region of interest 703 is assumed to be constant throughout the duration of the clip.

The deep learning model 709 predicts the probability that an input M-mode image exhibits the absence of lung sliding, which is the output of the sigmoid final layer. The priority metric of the deep learning model 709 is a sensitivity toward absent lung sliding. Given the clinical importance of pneumothorax, this priority is guided by the notion that false negatives may cause more harm and are less desirable than false positives. In the case of a false negative, a patient sample would be predicted to have lung sliding (normal) when the truth is absent lung sliding (pathological). To achieve this emphasis on sensitivity, a hyperparameter optimization is performed, based on a Bayesian hyperparameter search, to identify an optimal combination of hyperparameters for the deep learning model 709.

The model is trained using the Adam optimizer to minimize the focal loss function, which aims to address class imbalance during training. This loss function contains two tunable parameters, y and a. In the described examples, the former, set to 1.18, is the focusing parameter responsible for adjusting the rate at which easy examples are downweighted. Similarly, the class balancing parameter a set to 0.11, is a class weight factor for addressing data imbalance. The focusing parameter may however be set in the range of 0 to 5, and the class weight factor may be in the range of 0.01 and 2. The deep learning model's 709 learning rate may be in the range of 0.00001 to 0.01 and, in the described examples, was initially set to $2 \times 10^{-4}$. The learning rate may be multiplied by a constant in the open interval (0,1) after a fixed number of training steps or epochs, facilitating the decay of the learning rate throughout training. After the first 15 epochs, learning rate decay is implemented by multiplying the previous epoch's learning rate by a constant factor of $e^{-0.06}$. These hyperparameters are chosen after an extensive hyperparameter search using Bayesian optimization. The hyperparameter search can be set up for, e.g., 60 runs. To increase confidence in the deep learning model's 709 generalizability for each hyperparameter combination, each run in the search consists of training the deep learning model 709 three times on the same hyperparameter combination but on different training and validation data splits. The average validation set performance of the three training runs is used as the result for each hyperparameter search run. Since sensitivity is a priority metric, a custom objective score can be used for the hyperparameter search which optimizes for sensitivity without severely sacrificing specificity. This score is a weighted sum of sensitivity and specificity, with weights 1.5 and 1.0, respectively. While the deep learning model 709 is set to train to a maximum of forty epochs, early stopping can be implemented, conditional on decreasing validation loss, using a patience of 12 epochs. In the described examples, the final deep learning model 709 was trained for 40 epochs, and the epoch-end model weights yielding the lowest validation loss, which occurred in epoch 37, were taken as the binary classifier of choice to be evaluated on the holdout test set.

M-mode images from about 15% of the patients are initially retained as a holdout test set for evaluating final model performance on unseen data. The remaining clips are split into ten folds for a stratified 10-fold cross validation test. The final model can then be trained with a split (by patient) of 75% training set, 10% validation set, and the 15% holdout test set.

Figure 8:
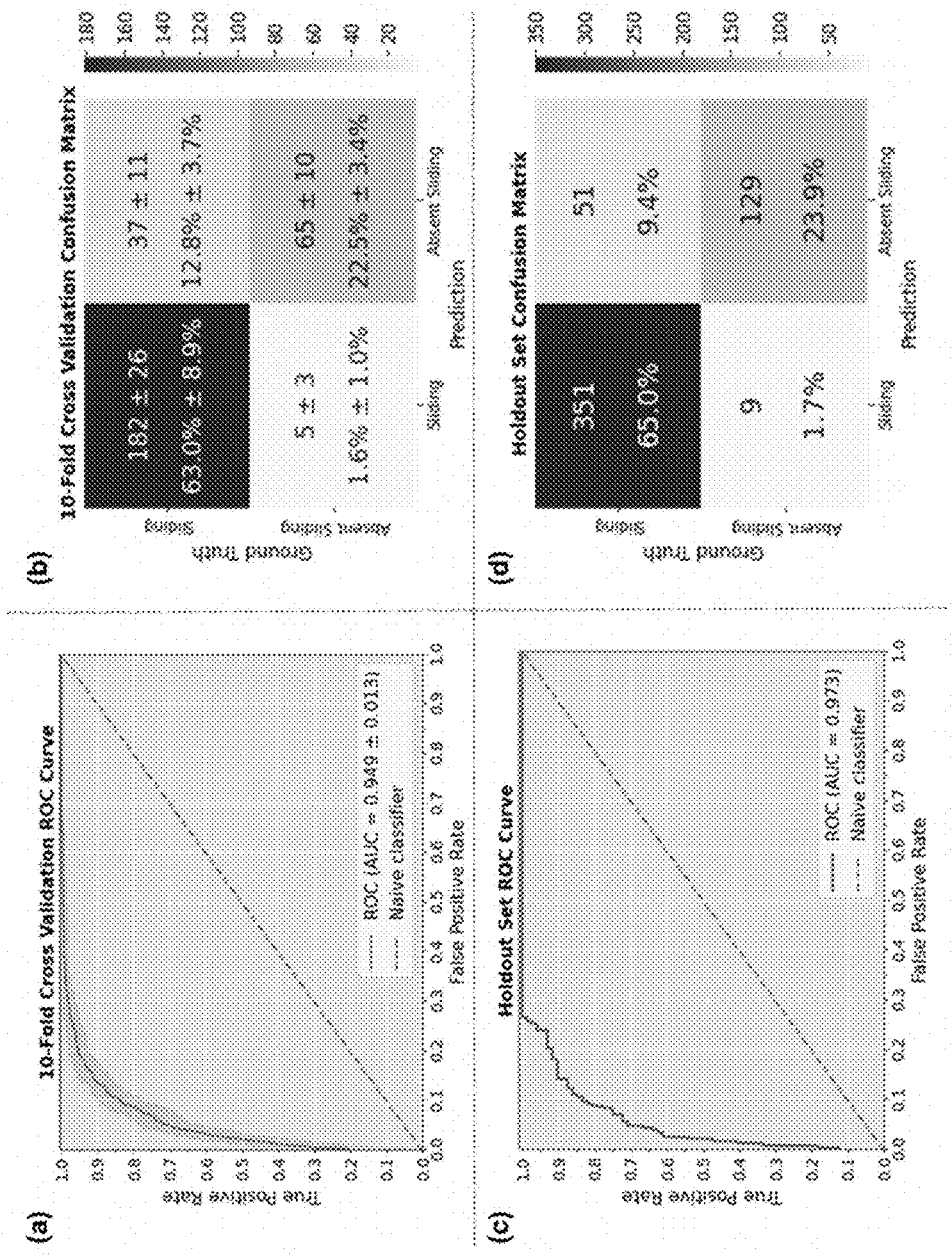
FIG. 8 is an illustration of performance metrics of the deep learning model of FIG. 1.

In the described embodiments, the 10-fold cross validation test yielded a 93.5% mean sensitivity for identifying absent lung sliding cases from M-mode images. The mean specificity, area under the receiver operating characteristic curve (AUC), and accuracy were 83.2%, 0.949, and 85.7%, respectively. A summary of the 10-fold cross validation results is shown in Table 2 showing the mean and standard deviation (STD). The model was also evaluated on the holdout test set for a final estimate of the deep learning model's 709 performance. The final deep learning model 709 yielded 93.5% sensitivity, 87.3% specificity, 0.973 AUC, and 88.9% accuracy on the holdout set. The receiver operating characteristic curves and confusion matrices of the 10-fold cross validation and holdout set experiments are provided in FIG. 8. FIG. 8 displays the AUC of the 10-fold cross validation test with an average of 0.949 at (a). The corresponding confusion matrix is at (b). The AUC of inference on the hold out set yielding 0.973 is at (c), with the corresponding confusion matrix at (d). Both the results of the deep learning model's 709 performance on the holdout set and the 10-fold cross validation experiment provide confidence in the deep learning model's 709 ability to achieve the desired objective. The sensitivity of the deep learning model 709 was prioritized without significantly sacrificing specificity. Furthermore, the standard deviations of the 10-fold cross validation metrics are reasonable and provide confidence in the deep learning model's 709 generalizability and consistency across different data splits.

TABLE 2

|       | Sensitivity/Recall | Specificity | AUC     | Accuracy |
|-------|--------------------|-------------|---------|----------|
| Mean  | 93.5%              | 83.2%       | 0.949   | 85.7%    |
| (STD) | (3.4%)             | (3.9%)      | (0.013) | (2.7%)   |

Figure 9:
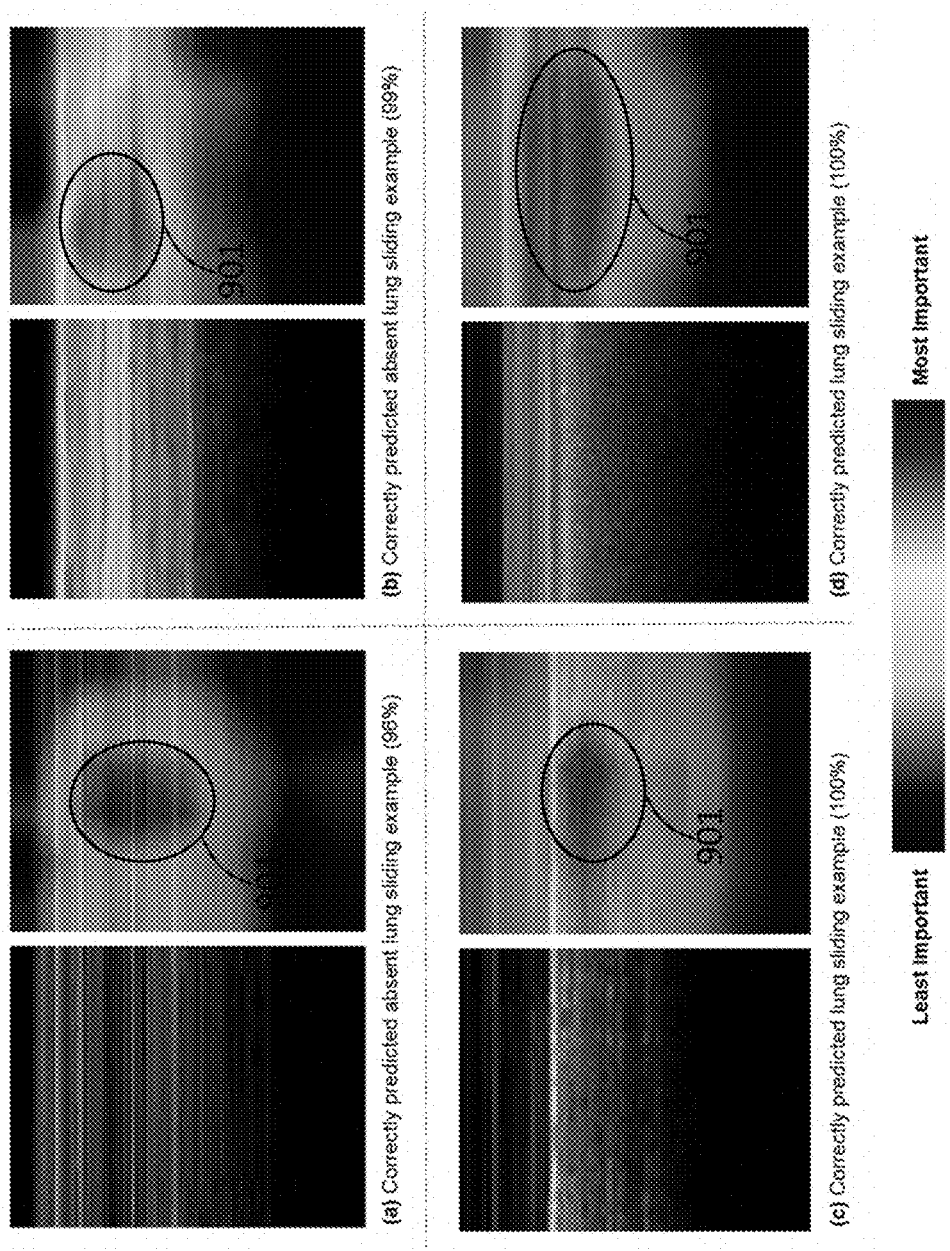
FIG. 9 is a view of M-mode ultrasound images with highlighted regions of interest.

In the described examples, a Gradient-weighted Class Activation Mapping (Grad-CAM) method was applied to visualize which components of the input M-mode images were most contributory to the deep learning model's 709 prediction. The results are conveyed on a heatmap, overlaid on the original input images. The heatmaps for the holdout set revealed appropriate regions 901 of prediction importance, centered around both the pleural line and the pattern that is below/deep to this line where the motion or absence of motion is interpreted by human operators. FIG. 9 shows the regions 901 most significant to the deep learning model's 709 prediction.

The combination of a wearable ultrasound device, such as device 102, with a deep learning model, such as model 709, expands the ability to perform accurate evaluation of pneumothorax in a larger population of patients. Due to its wearable nature, the wearable ultrasound device 102 does not require the image acquisition expertise typically required using conventional techniques. Similar to the adhesive pads of an electrocardiogram electrode, the ultrasound sensor 120 is able to be applied by any individual capable of following basic instructions, including even patients themselves. Further, the interpretation of the wearable ultrasound device 102 no longer calls for clinician expertise, as the prediction is automated through the deep learning model 709.

Due to the image generation and image interpretation being automated, the wearable ultrasound device 102 can be used by non-traditional users of ultrasound including but not limited to: nurses, respiratory therapists, midwives, physician assistants, paramedics, military medics/personnel, firemen/women, police officers, pharmacists and patients themselves.

Automating the detection of pneumothorax offers advantages in a number of scenarios by a number of different potential users. The ability to detect pneumothorax in a continuous fashion further expands these opportunities. If pneumothorax develops, the loss of the lung sliding occurs and is detected passively by the wearable ultrasound device 102 and alerts the healthcare team allowing timely identification, investigation and clinical decision making prior to progressing to an emergency condition. The context of use for the wearable ultrasound 102 may include, but is not limited to, the below clinical/patient scenarios:

Evaluation for the development of pneumothorax in those at continuous risk—namely those undergoing invasive, positive pressure mechanical ventilation for respiratory support in an intensive care unit or operating room environment.

Those undergoing procedures where risk of puncturing the lung/pleural space (thereby creating a pneumothorax) is present. This would include thoracentesis, central venous catheter insertion, paracentesis, pericardiocentesis, any thoracic or cardiac surgery, pacemaker insertion, acupuncture of the thorax.

Those undergoing removal of chest drainage devices where (re)accumulation of pneumothorax can occur.

Those flying at altitude (e.g., air ambulance) where development of pneumothorax is difficult to assess and where aeronautical decisions (pressurization, flying altitude) may be influenced by the presence or absence of pneumothorax.

Those being transported by land ambulance with longer transport times to health care facilities where the risk of pneumothorax is present.

Those engaged in high-risk activities for blunt or penetrating trauma to the torso (military, high impact sports) where timely or real time evaluation for pneumothorax is of value.

While the monitoring and detection system 100 described in the embodiments above is for the detection of pneumothorax, it may be applicable for the detection of other similar conditions.

As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Reference herein to "example" means that one or more feature, structure, element, component, characteristic and/or operational step described in connection with the example is included in at least one embodiment and/or implementation of the subject matter according to the subject disclosure. Thus, the phrases "an example," "another example" and similar language throughout the subject disclosure may, but do not necessarily, refer to the same example. Further, the subject matter characterizing any one example may, but does not necessarily, include the subject matter characterizing any other example.

Unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "affixed" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly affixed" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can however, encompass different orientations in use or operation in addition to the orientation depicted in the figures.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art. Although embodiments have been described above with reference to the accompanying drawings, those of skill in the art will appreciate that variations and modifications may be made without departing from the scope thereof as defined by the appended claims.

What is claimed is:

1. A system for autonomously detecting a condition based on at least one ultrasound image of a lung, the system comprising:
   a wearable sensor for detecting an ultrasound pulse and automatically transmitting the ultrasound pulse to a digitizer for converting into a digital ultrasound image; and
   at least one processor operatively connected to the wearable sensor and configured to periodically:
   receive the digital ultrasound image; and
   provide the digital ultrasound image to a machine learning model to predict a probability of lung sliding;
   wherein the wearable sensor comprises:
   a first electrode having a first surface and a second surface wherein the first surface of the first electrode is for contacting a surface;
   a second electrode having a first surface and a second surface and wherein the second electrode overlaps the first electrode;
   a piezoelectric polymer film layer positioned between the second surface of the first electrode and the first surface of the second electrode;
   an acoustic insulation layer positioned overlapping the second surface of the second electrode, wherein the acoustic insulation layer is an air gap layer;
   an electromagnetic shielding layer positioned overlapping the second electrode;
   a protection layer overlapping the electromagnetic shielding layer; and
   wherein an active sensing area is an area defined by the overlapping of the first electrode and the second electrode.

2. The system of claim 1, wherein the condition is pneumothorax.

3. The system of claim 1, wherein an ultrasonic device for transmitting and receiving ultrasound pulses is coupled to the first electrode and the second electrode.

4. The system of claim 1, wherein the digital ultrasound image is an M-mode image.

5. The system of claim 1, wherein the machine learning model is a convolutional neural network.

6. The system of claim 5, wherein the machine learning model is instantiated from a transfer learning approach using a pre-defined network architecture including at least one of EfficientNetB0, ResNet, and MobileNet.

7. The system of claim 5, wherein the at least one processor operatively connected to the wearable sensor is further configured to train the machine learning model based on being pre-trained on an ImageNet database.

8. The system of claim 5, wherein the at least one processor operatively connected to the wearable sensor is further configured to train the machine learning model based on being pre-trained on ultrasound images using self-supervised learning techniques.

9. The system of claim 5, wherein the machine learning model includes a custom top block containing a global average pooling layer, followed by a series of fully connected layers with dropout interleaved.

10. The system of claim 5, wherein a priority metric of the machine learning model is a sensitivity toward absent lung sliding.

11. The system of claim 5, wherein the at least one processor operatively connected to the wearable sensor is further configured to optimize a set of hyperparameters for the machine learning model based on hyperparameter optimization.

12. The system of claim 11, wherein the hyperparameter optimization comprises using an optimizer with a learning rate in a range of between 0.00001 and 0.01.

13. The system of claim 11, wherein a learning rate is multiplied by a constant in an open interval (0,1) after a fixed number of training steps, facilitating a decay of the learning rate throughout training.

14. The system of claim 11, wherein a focusing parameter is in a range of between 0 and 5, and a class weight factor is in a range of 0.01 and 2.

15. The system of claim 11, wherein the hyperparameter optimization comprises running a hyperparameter search for a plurality of iterations.

16. The system of claim 5, wherein the predicted probability is an output of a sigmoid final layer of the machine learning model.

17. The system of claim 1, wherein the at least one processor operatively connected to the wearable sensor is further configured to output the predicted probability to a display.

18. The system of claim 1, wherein the at least one processor operatively connected to the wearable sensor is further configured to send an alert to a display when the predicted probability of absent lung sliding is greater than 90%.

19. A method of autonomously detecting a condition based on at least one ultrasound image of a lung, the method comprising:
   receiving the ultrasound image from a wearable sensor in contact with a surface;
   providing the ultrasound image to a machine learning model to predict a probability of lung sliding;

wherein the receiving further comprises periodically receiving ultrasound information for a duration the wearable sensor is in contact with the surface;

wherein the wearable sensor comprises:

a first electrode having a first surface and a second surface wherein the first surface of the first electrode is for contacting a surface;

a second electrode having a first surface and a second surface and wherein the second electrode overlaps the first electrode;

a piezoelectric polymer film layer positioned between the second surface of the first electrode and the first surface of the second electrode;

an acoustic insulation layer positioned overlapping the second surface of the second electrode, wherein the acoustic insulation layer is an air gap layer;

an electromagnetic shielding layer positioned overlapping the second electrode;

a protection layer overlapping the electromagnetic shielding layer; and wherein an active sensing area is an area defined by the overlapping of the first electrode and the second electrode.

\* \* \* \* \*